United States Patent Office 2,726,953
Patented Dec. 13, 1955

2,726,953

SELECTIVE NUCLEATED PRECIPITATION FROM ACIDIC SOLUTIONS

Tuhin Kumar Roy, Elizabeth, N. J., and Felix Alfred Schaufelberger, Stamford, Conn., assignors to Chemical Construction Corporation, New York, N. Y., a corporation of Delaware No Drawing. Application June 21, 1954,
Serial No. 438,316

5 Claims. (Cl. 75—108)

The present invention is concerned with the hydrometallurgical production of non-ferrous metals, particularly cobalt and nickel, and primarily also with their recovery from non-sulfide ores. Still more specifically, the present invention is concerned with a method of precipitating nickel and cobalt values from a leach liquor as their metal sulfides, while retaining in solution the bulk of any dissolved iron, aluminum, manganese and alkaline-earth metals.

In general, the process of the present invention is both surprisingly simple and highly effective. Briefly, it comprises the steps of adjusting the pH of the solution as required, clarifying a pregnant acid leach liquor and then treating clarified solution with hydrogen sulfide at elevated temperatures and pressures in the presence of a nucleating agent. Thereby, cobalt and nickel are substantially completely precipitated as their sulfides. So-precipitated cobalt and nickel sulfides are then collected by known methods such as by froth flotation or some equivalent process.

In recent years, the increasing demand for nickel and cobalt has produced an increasing consideration of ores which are not particularly amenable to treatment by known methods. For example, in various parts of the world, cobalt and/or nickel-bearing minerals are found in various degrees of concentration, in ore bodies which are variously referred to as lateritic, oxidized, siliceous, non-sulfide or weathered silicate ores. In such deposits, mineral values are found as oxides or carbonates, usually basic, and as other partially broken-down silicates along with excessive amounts of siliceous gangue.

Such ores are normally characterized by the absence of sulfur or sulfides and therefore they will be generically designated and discussed as non-sulfide ores. Ordinarily these ores are high in iron content, quite high in aluminum and have varied contents, usually smaller, of such other extraneous metals as zinc, manganese, chromium, the alkaline-earth metals and the like, the oxides of which are relatively insoluble.

In recent years, too, there has been a continued growth of interest in hydrometallurgical methods for the production of non-ferrous metals, particularly of copper, nickel and cobalt. Various methods, some of them useful, have been proposed by which it is possible to put the non-ferrous metal content of an ore into solution. In some cases basic solutions have been employed, in others acidic. The present invention is primarily concerned with the latter.

A further problem, however, has been to develop suitable hydrometallurgical procedures for recovering cobalt and/or nickel, either as compounds thereof or as elemental metals, but sufficiently free from contaminant metals which dissolve concomitantly therewith, particularly iron, aluminum, chromium, zinc and manganese. In general, the processes previously proposed have been deficient to the desired standard, either in obtaining adequately complete recovery or in adequately selective operation.

It is, therefore, the principal object of the present invention to provide a commercially acceptable, hydrometallurgical method of selectively separating the desired non-ferrous metals with high recovery from the residual dissolved metal content. At the same time it is a further object to concentrate them in the smallest possible bulk for subsequent treatment to produce elemental metal by hydrometallurgical methods which form no part of the present process.

A brief description of the overall process has been given above. It is highly surprising, in view of the common knowledge that nickel and/or cobalt normally are ot precipitated from dilute mineral acid solutions by the use of hydrogen sulfide at normal conditions, that the process of the present invention is capable of operation. Much less is it to be expected that precipitation would be usefully complete or selective. The degree of sucess involved is directly attributable to the utilization of properly controlled conditions of acidity, temperature, pressure and a suitable nucleating agent. The conditions of reaction must be independently controlled within their optimum ranges in order to obtain the desired result.

It should be realized in discussing the present process that there is no critical individual control which is responsible for success or failure of the process as a whole. Other than the presence or absence of a suitable nucleating agent, there are no definite upper or lower control limits within which the process will work and beyond which the process cannot be said to operate. Changing any one of the variable operating conditions produces its most marked effect in the period of time required in completing the reaction or in the degree to which the reaction can be carried to completion. For example, the general assumption of the impossibility of precipitating nickel, from acid solutions with hydrogen sulfide, is based not on actual impossibility but rather on such an extremely slow reaction rate than an impractical time is required. In infinite time, all of the nickel would probably be precipitated. Such a process, obviously, has no useful commercial application.

Accordingly, in setting forth the present invention it will be assumed that a successful process is one which can be adapted for commercial utilization. Such a process, for purposes of this discussion is considered to be one which is capable of producing at least 98% precipitation of the nickel and/or cobalt in less than about two hours. More desirable is a reaction period of one hour or less. Precipitation of 99% or more is obtainable within the prescribed time limit.

It is an advantage of the present invention as well as one of its surprising features that the process may be applied readily and effectively to the whole bulk of the exit leach liquor. Precipitation is astonishingly rapid and complete even on liquors having before treatment a low content of the metal or metals of interest.

In general, the process may be readily outlined. Since most acidic leach liquors contain too high a free acid content for the present purposes, the first positive step usually comprises any necessary adjustment of the pH content. If so desired, this may be done on the whole bulk solution. Concentration to smaller bulk as by evaporation may be used if so desired. Commercially, pH adjustment will usually be accomplished with limestone or the like which will result in adding insoluble material. In such cases, it is usually desirable to carry out the neutralization before separating the liquor from the leach tailing solids. In some cases, the opposite will be true. However, this is purely a practical question. Other neutralizing agents may be used and neutralization may be done either before or after removing the liquor from the leach tailings. If the liquor is too basic due to prior operation, it may be acidified.

Determination of the extent to which the pH should be adjusted introduces several considerations. If the acid content becomes too high, the reaction slows down very rapidly. If the acid content reaches about 3-4%, the rate becomes so slow that complete precipitation within the desired time limit is unlikely. On the other hand, if the pH becomes too high, the precipitation loses its selectivity.

Moreover, it is necessary to allow for the fact that as hydrogen sulfide is used up in precipitation of the sulfides of the metals of interest the acid content rises. To prevent the resulting acid increase from exceeding the upper limit before precipitation is sufficiently complete, some degree of control is necessary. In most cases this can be done by adjusting the initial pH to some value low enough that reaction is rapid but high enough so that the acid liberated concomitantly with the precipitation will not carry that total above the limiting factor before precipitation is complete.

With this control in mind, the solution is given the necessary adjustment in acid content. Usually it is treated to produce a pH of from about 1.0 to about 3.0, preferably from about 2.0 to about 2.5. In this range it has been found that as a starting point for the process the desired result is readily obtained in the desired time. Reduction of the cobalt and/or nickel content to as low as 0.1 gram per liter is readily obtained from solutions initially as high in acid as 0.4% sulfuric acid. In general, the highest initial acidity that can be used without the terminal acidity exceeding the indicated limits is to be preferred.

When the solute content is too high for control of the terminal condition by adjustment of the initial acid content, the use of $H_2S$ as the precipitant may be supplemented by the use of some acid neutralizing sulfide such as sodium or ammonium sulfide and the like. It is possible to add some basic reactant such as caustic or the like. However, in general the use of supplemental alkalizing agents such as lime which will produce insoluble reaction products should be avoided at this stage.

It has also been found that this preferred pH range insures against possible excessive precipitation of insolubles other than sulfides of the desired metals. For example, if there is a high content of dissolved aluminum, and the initial pH is above about 3.5, there readily may be sufficient dissolved aluminum to exceed the solubility product. This is primarily true in operating continuously. In a batch process the initial pH may be adjusted to any value at which solids other than the desired sulfides do not precipitate during hydrogen sulfide treatment. Usually this will be restricted to pH ranges at which oxides of other dissolved metals do not form.

In order to initiate and maintain the reaction at the desired rate and obtain the necessary complete precipitation, the temperature should be controlled. The initial temperature should be above 90° C. and preferably above about 100° C. On the other hand, because of the solubility problems, the temperature should not exceed that which is necessary. Usually about 150° C. will constitute the upper limit. If the apparatus will withstand the pressure, higher temperature with correspondingly higher pressures may be used but they are not necessary. Temperatures below about 90°–100° C. are not effective in this process.

Therefore, clarified, pH adjusted liquor, in a suitable pressure vessel, is heated and subjected to an overpressure of hydrogen sulfide and treated with efficient agitation at the operating temperature and pressure until the reduction in dissolved metal content by sulfide precipitation is sufficiently complete.

Hydrogen sulfide as the precipitating agent must be supplied in adequate amount. Practically, it will be supplied by being injected below the surface of the liquor. However, in some cases it may be added from above. It is necessary not only to have a total pressure equivalent to the temperature but also to develop in the solution a sufficient sulfide ion content. This can be accomplished by using an overpressure of hydrogen sulfide of about 25 pounds per square inch gauge (p. s. i. g.) or higher. Over pressures exceeding 100 p. s. i. g. may be used if so desired, but ordinarily are not necessary.

Agitation as a factor of control is particularly difficult to define. The vessel should be equipped for agitation, however, and it should be efficient and thorough. Otherwise, precipitation of sulfides is neither rapid nor complete.

It is a feature of the present invention that copper and/or zinc if present in the ore constitute valuable byproducts. They normally dissolve concomitantly with the cobalt and nickel in most leaching operations. Copper, of course, is easily precipitated even from strongly acidic solutions. It is surprising that zinc is precipitated in the present process and if cobalt or nickel is present will be precipitated therewith. Copper and/or zinc may be separated from cobalt and nickel and recovered during subsequent steps of producing metallic nickel and/or cobalt from the sulfides. The latter operations form no part of the present invention. The same consideration is applicable to cadmium if it is present in the liquor.

It is a particular feature of the present invention that substantially all of the common ores contain some iron which is a highly undesirable contaminant in the ultimate cobalt and/or metal product. Since some iron is unavoidably dissolved in most known methods of leaching, it is a particular advantage of the invention that the nonferrous metal sulfides are precipitated quite selectively, the iron content being very low in the precipitate as compared with the initial nickel or cobalt to iron ratio in the liquor. If aluminum is present in the liquor and the controls are maintained within the indicated optimum ranges, very little aluminum will be precipitated. The same advantages are obtainable with respect to manganese, chromium, the alkaline-earth metals, particularly magnesium and calcium. The alkaline-earth metal feature is particularly advantageous because it permits the use of lime or magnesia as the neutralizing agent in the initial pH adjustment step.

It is highly desirable, if not actually essential, to use a reduction vessel which is substantially unattacked chemically under the operating conditions. In using autoclave surfaces of corrosion resistant alloys such as stainless steel or the like, it is found that using only the $H_2S$ gas in the present process causes much, and in some cases substantially all, of the sulfide precipitate to adhere or "plate" out on the walls of the vessel. This requires troublesome periodic cleaning and scraping of the plated product therefrom. Similar plating also occurs on titanium walled vessels. Other types of corrosion resistant liners such as glass or plastic are usually less troubled in this respect if sufficiently smooth, but still quite frequently are found to retain up to ten per cent or more of the sulfide precipitate.

A particular feature of the present process is the elimination of this difficulty. It has been found that adding to the liquor to be treated a small quantity of finely-ground solid material substantially eliminates this wall coating phenomenon. Such material should be either chemically neutral under the operating conditions or of such nature as to introduce no undesirable soluble products into the sulfide precipitate. One group of highly effective solids are finely-ground oxides or sulfides of the metals being precipitated. These will dissolve in the subsequent treatment of the product sulfide precipitate to produce metal. Another group of materials are those which are insoluble in subsequent treatment of the sulfide precipitate. These include finely-powdered infusorial earth, talc, graphite, and the like. A particularly useful form of graphite is one of the commercial products which contain both powder and flake and usually have been treated to be easily suspended in water. If possible, the added solids materials should be sufficiently fine to pass a 200 mesh screen. In any case, it should be smaller than about 60 mesh. A good size range is minus 200, plus 325 mesh material when it is available.

A relatively small amount of added solids is usually sufficient. As little as about 0.1 g./l. will produce noticeable results. Up to about five per cent by weight of the solids to be precipitated will be adequate. More can be used but is not necessary. It will be found desirable to use from about 0.1 to about 5.0 grams per liter of solution to be treated.

The invention will be more fully illustrated in conjunction with the following examples. These examples are intended as illustrative only and not by way of limitation.

In the first group of examples, the test solution used is an acid leach liquor obtained from a concentrate of a Cuban lateritic ore. The dissolved content in grams per liter is: Ni—5.49, Co—0.45, Al—5.99, Fe—1.09, Mn—2.65, Mg—0.21. The solution contains about 14–15 grams of free sulfuric acid and is neutralized to about pH 2.5 before use in the examples.

EXAMPLE 1

To a one gallon autoclave having a 316 stainless steel liner and a propeller type stirrer is charged one liter of the test liquor. The autoclave is closed, heated to about 100° C., subjected to an overpressure of 50 p. s. i. g. of $H_2S$ and treated for one hour with the impeller rotated at about 600 R. P. M. At the end of the test 99.7% of the nickel and 99.1% of the cobalt is precipitated as their sulfides. Approximately 99% of the precipitate is in a soft plating on the walls of the autoclave.

EXAMPLE 2

Example 1 is repeated with 0.1 gram of finely ground infusorial earth being added to the charge. At the end of the test 99.98% of the nickel and 99.9% of the cobalt is found to be precipitated as a rapidly settling sulfide product. Only a small amount of the precipitate is deposited on the walls of the vessel. The precipitate contains 2.08% Fe and 0.22% Al, the balance being sulfides of nickel and cobalt.

EXAMPLE 3

Example 2 is repeated substituting colloidal graphite for the infusorial earth. Substantially comparable results are obtained.

EXAMPLE 4

Example 2 is repeated substituting talc (technical grade talcum powder) for the infusorial earth. Substantially comparable results are obtained.

EXAMPLE 5

A sample of the sulfides precipitate of Example 2 is treated by roasting in air for one hour at about 600° C. Example 2 is repeated substituting 5 grams of resultant calcine (minus 270, plus 325 mesh) for the infusorial earth. Again substantially comparable results are obtained.

EXAMPLE 6

To a one gallon autoclave equipped with a glass liner and a propeller type stirrer is charged one liter of the test solution. The procedure of Example 1 is repeated thereon. At the end of the test 99.6% of the nickel and 99.8% of the cobalt is precipitated as a sulfide powder analyzing 1.1% Fe and 0.2% Al, the balance being sulfides of nickel and cobalt. About 8% of the precipitate is retained on the walls of the vessel.

EXAMPLE 7

Example 6 is repeated adding 0.1 gram of finely ground infusorial earth to the liquor. Substantially the same result as Example 1 is obtained with very slight plating on the glass liner. 99.8% of the nickel and 99.9% of the cobalt is precipitated.

EXAMPLE 8

Example 6 is repeated in an autoclave lined with titanium metal. Substantially comparable results are obtained. Repeating the procedure but adding finely-powder (minus 270, plus 325 mesh) sulfide residue produced in previous runs substantially eliminates plating.

EXAMPLE 9

To illustrate the rapidity of the reaction rate of the present process a series of sample leach liquors were obtained within the following concentrations:

| Metal | Range of Concentration (g./l.) |
|---|---|
| Ni | 5.0 –5.5 |
| Co | 0.44–0.54 |
| Al | 6.0 –6.3 |
| Fe | 0.9 –1.1 |
| Mn | 1.7 –2.7 |
| Mg | 0.06–0.34 |

3.5 liter samples are charged to a glass lined autoclave, heated to above about 100° C., subjected to 50 p. s. i. g. of $H_2S$ and reduced for varying lengths of time with thorough stirring. Illustrative results are shown as summarized in the following table:

Table I

| Time (Minutes) | Percent Precipitated | |
|---|---|---|
| | Ni | Co |
| 5 | 99.3 | 98.7 |
| 10 | 99.6 | 99.2 |
| 15 | 99.7 | 99.5 |

While in the foregoing discussion, sulfate solutions have been taken as illustrative, the process of the present invention is not necessarily so limited. The process is also effective on leach liquors obtained by carbonate leaching. If the liquor is basic, the hydrogen ion content can be brought to the correct pH range by the addition of acid. Other acids may be encountered, such as hydrochloric. It is not as desirable as sulfuric from the point of view of the present process, it presenting corrosion problems which are more troublesome. However, it can be handled if so desired.

As noted above, if the leach liquors contain copper and/or zinc, these metals will be precipitated; by themselves if they are the only metals present, conjointly if both are present, and conjointly with cobalt and/or nickel if the latter are present. If so desired, copper may be selectively precipitated in an initial step before taking the cobalt, nickel or zinc.

The process is particularly advantageous in that the bulk of the iron, aluminum and the alkaline-earth metals are retained in solution along with any manganese which may be present.

EXAMPLE 10

Another example to illustrate the rapidity of the reaction rate at an initial sulfuric acid content of 15 g./l. was obtained with the following concentrations:

| | G./l. |
|---|---|
| Ni | 4.87 |
| Co | 0.45 |
| Al | 4.5 |
| Fe | 0.75 |
| Mn | 1.5 |
| Mg | 0.28 |
| Co | 1.26 |

3.5 liter samples were charged to the glass lined autoclave, heated to a temperature of 120° C. and subjected to 100 p. s. i. g. of H₂S for varying lengths of time with thorough stirring. The results are summarized in the following table:

Table II

| Time (Minutes) | Percent Precipitated ||
|---|---|---|
| | Ni | Co |
| 10 | 97.8 | 87.4 |
| 20 | 98.2 | 88.0 |
| 30 | 98.0 | 88.9 |

These results illustrate the fact that higher acid concentration slows down the precipitation of the nickel and cobalt. The sulfide residue obtained analyzed 55% Ni, 4.7% Co, 0.75% Fe, 0.025% Al, 0.005% Co, 39.6% S.

We claim:

1. In the hydrometallurgical production of non-ferrous metals, wherein an aqueous acid liquor containing (a) at least one dissolved metal value of interest selected from the group consisting of cobalt, copper, nickel and zinc, and (b) at least one dissolved contaminant metal selected from the group consisting of calcium, aluminum, magnesium, manganese and iron, is treated with hydrogen sulfide to chemically precipitate said metal content of interest, the improved method of selectively concentrating the content of said metal-value-of-interest and separating the same from the content of said dissolved contaminant metal which comprises the steps of: adjusting the free acid content of the liquor to less than that at about 3% but more than that equivalent to a pH of about 3.5; adding as the nucleating agent, from about 0.1 to about five grams per liter of added minus 60 mesh powdered non-metallic solid material; producing in resultant slurry a temperature of from about 90° to about 150° C.; subjecting said hot slurry to an over-pressure of at least 25 p. s. i. g. of hydrogen sulfiide and continuing treatment with agitation until sulfide precipitation substantially ceases.

2. A process according to claim 1 in which said nucleating agent is a finely-divided powder comprising an oxide of at least one metal value of interest.

3. A process according to claim 1 in which said nucleating agent is a finely-divided powder comprising at least one sulfide of a metal value of interest.

4. A process according to claim 1 in which said nucleating agent is a finely-divided extraneous solid which is chemically neutral during treatment.

5. A process according to claim 1 in which the extraneous solid is graphite.

References Cited in the file of this patent

UNITED STATES PATENTS

| 1,503,229 | Clark | July 29, 1924 |

FOREIGN PATENTS

| 720,881 | Germany | May 18, 1942 |
| 915,268 | Germany | July 19, 1954 |